Jan. 3, 1933. W. H. TICE 1,893,114
LOCK WASHER
Filed Oct. 1, 1929
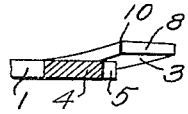
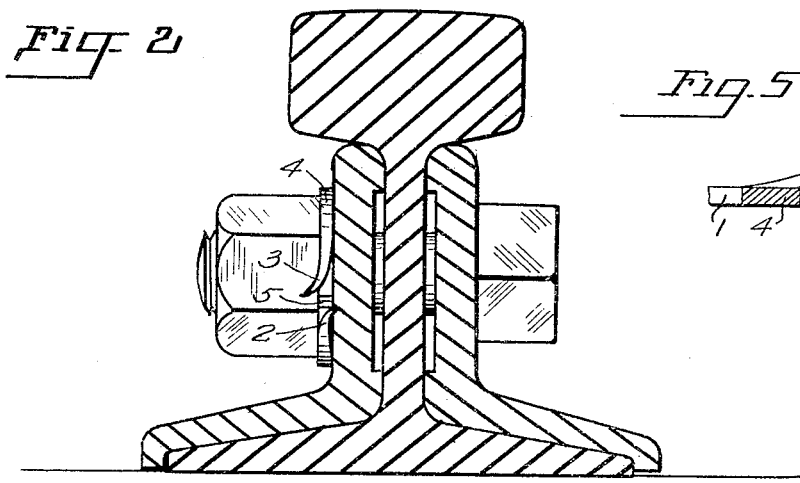
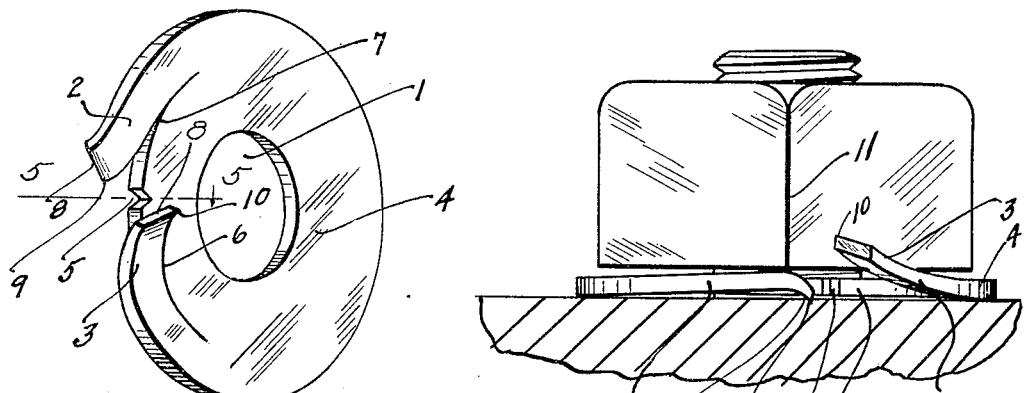
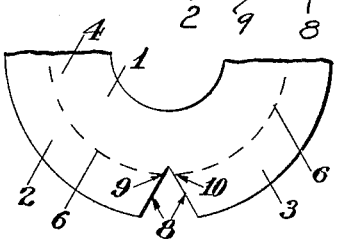
Inventor
William Henry Tice
By Thomas Bilyeu
Attorney Patented Jan. 3, 1933

1,893,114

UNITED STATES PATENT OFFICE

WILLIAM HENRY TICE, OF PORTLAND, OREGON, ASSIGNOR TO TICE LOCK WASHER MANUFACTURING COMPANY, OF PORTLAND, OREGON, A CORPORATION OF OREGON

LOCK WASHER

Application filed October 1, 1929. Serial No. 396,433.

My invention is primarily intended for use as a lock washer wherever nuts are fastened to bolts. The same is especially adaptable for automotive equipment, railway trackage and railway equipment and in any and all places where a substantial amount of movement or jar is being created by the elements in which the fastenings are disposed.

The invention consists primarily of a one-piece structure having a central endless disk. Upon one side and adjacent one edge of the endless disk, two engaging, locking jaws are formed. The points of each of the jaws lie outside of the plane of the body element and the respective jaws are formed at oppositely disposed sides of the body element so that one of the jaws may be made to engage the surface upon which the same rests and the other of the jaws be made to engage the outside surface of the nut. The purpose of the locking jaws is to prevent the turning of the nut relative to the washer and bolt to which the same is secured.

My invention is primarily made of spring material, of relatively thin stock, and is so formed that when placed upon the bolt, either under the head or under the nut, will have the whole of the head, or nut, resting upon a smooth even surface and without being distorted in alignment to the surface of the nut or bolt head when in its normal position.

One of the objects of my invention is to provide a lock washer of minimum weight and so made that the full bearing value of the nut, or of the head of the bolt, will be developed and so aligned that the bolt and the nut will rest in their normal alignment and without distortion. The locking jaws of the lock washer are so positioned and function to prevent the turning of the locked elements.

A further object of my invention consists in the construction of a lock washer to prevent the normal tangling or locking of the washers together in shipment.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a perspective, side view of one of my new and improved lock washers.

Fig. 2 is a sectional, end view of a railway rail illustrating the angle bars in position upon the rail and illustrating one of my washers in position upon the fastening bolt of the rail joint.

Fig. 3 is a side view of a nut in position upon a bolt and illustrating one of my new and improved lock washers in position upon the bolt and between the nut and the surface through which the bolt passes.

Fig. 4 is a top, plan view of the mechanism illustrated in Fig. 1.

Fig. 5 is a detail cross section taken approximately on the line 5—5 of Figure 1, looking in the direction of Figure 6.

Fig. 6 is a detail fragmentary view of the washer blank after the V-shaped portion has been removed and before the jaws are stamped or offset, the slits being shown in dotted lines.

Like reference characters refer to like parts throughout the several views.

I preferably form my device of a body element having a hole 1 passing therethrough. In the forming of my washer I first notch out of the sheet from which the washer is to be made, a triangular shaped piece that extends through the jaws 2 and 3 formed adjacent each other and about the central portion of the body element 4. The notch extends inwardly from the locking jaws and within the central body portion of the body element as illustrated at 5 in Fig. 1. The jaws 2 and 3 are sheared from the body element as illustrated at 6 and 7 for a substantial distance from the notch. The amount or length of the shear is determined by the size of the washer and character of use to which the washer is to be placed. The jaws 2 and 3 are then swedged to form tapering jaws, the taper being uniform and slight from the end of the shear to the end of the jaw, and the jaws are slightly tapered also in cross sectional area.

The cutting out of the triangular portion (see Figure 6) produces an edge 8 on each of the locking jaws that is disposed at an angle to a radius of the washer passing through the point of the triangle, i. e. the edges 8 of the jaws diverge outwardly. When the jaws are bent out of the plane of the washer (see Figures 1, 3 and 5) there will be points 9 and 10 located at the inner corners of each jaw, which corners lie farthest from the general plane of the washer 4. Thus when a jaw is forced into biting contact with a surface the contact will commence as a point contact at either 9 or 10 as the case may be and this enables the jaw to bite in more easily than where the contact is a line contact at the start. As the jaws are tapered in their longitudinal direction toward the free ends and as they are slightly tapered transversely from their inner longitudinal edges toward their outer periphery, see Figure 5, and as the faces 8 diverge outwardly there are continuously being provided points of contact 9 and 10 between the jaws and the fish plate or other surface against which the jaws are forced. The fastening jaws are thus inclined or offset, so that the points 9 and 10 will extend from the faces of the primary plane in which the surface of the body element is disposed. A washer thus formed is reversible and may be used either side up when in use. The sheared surfaces are disposed outwardly from the greatest diameter of the flat surface disposed upon the side walls of the nut.

In the turning of the nut upon the washer as illustrated in Fig. 3 the corner of the nut 11 as it is tightened upon the lock washer hammers the point 9, as illustrated in Fig. 3, into the supporting surface and the turning of the nut about the upwardly disposed locking jaw 3 as illustrated in Fig. 3 bends the jaw 3 down as each corner of the nut passes thereover until the nut has been forced home relative to the bolt, at which time the upwardly disposed body 3 will prevent the rotation of the nut about the supporting bolt by engaging the side walls of the nut. The entire under surface of the nut when in normal locked position rests evenly and squarely upon the surface of the washer and the nut is not distorted in alignment or position relative to the bolt upon which the same is placed.

As is clearly illustrated in Figure 4 it will be seen that the inner edges formed by the slits 6 and 7 of the jaws 2 and 3 lie approximately a distance from the center of the nut equal to that of the minor diameter of the nut or bolt head so that the jaw which is adjacent to the nut or bolt head may spring up and engage the flat or side wall face of the nut or bolt head, while the other jaw underlies the angle or corner of the nut or bolt head and is thereby pressed against the fish plate or other body which it is to engage.

It will also be noted that by reason of the longitudinal slight tapering of the jaws and the transverse tapering of the same together with the V-shaped or diverging faces at the proximate ends of the jaws the point 9 or 10 as the case may be will continuously bite into the part against which it is forced and thereby insure the jaw effecting a bite into the part against which it is forced with minimum pressure. In other words, as the washer is forced home the point 9 or 10 as the case may be will dig, beginning with a point contact and eventually spreading to a chisel contact, with the point 9 or 10 as the case may be in maximum pressure contact. This construction increases the effectiveness of the hold of the washer on the fish plate or body against which it is forced without undue strain on the nut.

By making the unbroken annulus of a maximum diameter approximately that of the minimum diameter of the nut or bolt head, it will be seen that the nut can be screwed home with complete contact between it and the said unbroken annulus and thereby the tendency to shear the bolt is reduced to a minimum.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A lock washer for nuts and bolts comprising an annulus which is unbroken in the general circular direction in which it extends, said annulus having a plurality of spring jaws integral with it, the inner longitudinal edges of which jaws lie at distances from the center of the washer approximately that, but slightly in excess, of the minor diameter of the nut or bolt head with which the washer is to be used, said jaws being arranged in pairs with their free ends in proximity, one jaw being extended beyond one face of the washer while the other jaw is extended beyond the outer face of the washer, thereby providing a reversible washer, one jaw of which will underlie the angle of a nut or bolt head and be pressed thereby into engagement with the adjacent part being secured while the other jaw will engage with a flat face of the contiguous side wall of the nut or bolt head, each spring jaw being so located with respect to the center of the washer that it will have its inner longitudinal edge arranged to lie beyond the minimum diameter limit of the nut or bolt and within the maximum diameter limit of the same, said jaws being tapered from their bases longitudinally to their free ends and transversely from their inner longitudinal edges toward their outer peripheral edges.

2. A lock washer for nuts and bolts comprising an annulus which is unbroken in the general circular direction in which it extends, said annulus having a plurality of spring jaws integral with it, the inner longitudinal edges of which jaws lie at distances from the center of the washer approximately that, but slightly in excess, of the minor diameter of the nut or bolt head with which the washer is to be used, said jaws being arranged in pairs with their free ends in proximity, one jaw being extended beyond one face of the washer while the other jaw is extended beyond the other face of the washer, thereby providing a reversible washer, one jaw of which will underlie the angle of a nut or bolt head and be pressed thereby into engagement with the adjacent part being secured while the other jaw will engage with a flat face of the contiguous side wall of the nut or bolt head, each spring jaw being so located with respect to the center of the washer that it will have its inner longitudinal edge arranged to lie beyond the minimum diameter limit of the nut or bolt and within the maximum diameter limit of the same, said jaws being tapered from their bases longitudinally to their free ends and transversely from their inner longitudinal edges toward their outer peripheral edges, the proximate end faces of said jaws diverging outwardly from their inner edges, all being arranged whereby when the washer is in use the inner corners of the jaws which lie farthest from the plane of the washer as a whole will provide continuously a point of contact with the wall against which the jaw is forced.

3. A lock washer for bolts and nuts comprising an annulus which is unbroken in the general circular direction in which it extends, said annulus being provided with oppositely extending longitudinal slits lying outside the minimum diameter of the nut or bolt head with which it is to cooperate and lying inside the maximum diameter thereof, said annulus having at a place between the opposed ends of the slits a V-shaped notch extending to the periphery of the washer and diverging outwardly, thereby defining a pair of spring jaws, whose opposite edges diverge outwardly from the slits, said jaws being offset to opposite faces of the washer and providing cutting or digging in corner points at the inner corners of the jaws, the aforesaid structure being such that a corner of the nut with which the washer cooperates will overlie one of the jaws and force it into biting contact with the surface beneath while the other jaw will extend up into engagement with one of the flat side faces of the nut for the purposes described.

WILLIAM HENRY TICE.